Sept. 5, 1961 E. C. CARLSON ET AL 2,998,834
FORAGE HARVESTER WITH UP-CUT CHOPPER AND BLOWER
Original Filed Nov. 5, 1956 3 Sheets-Sheet 2
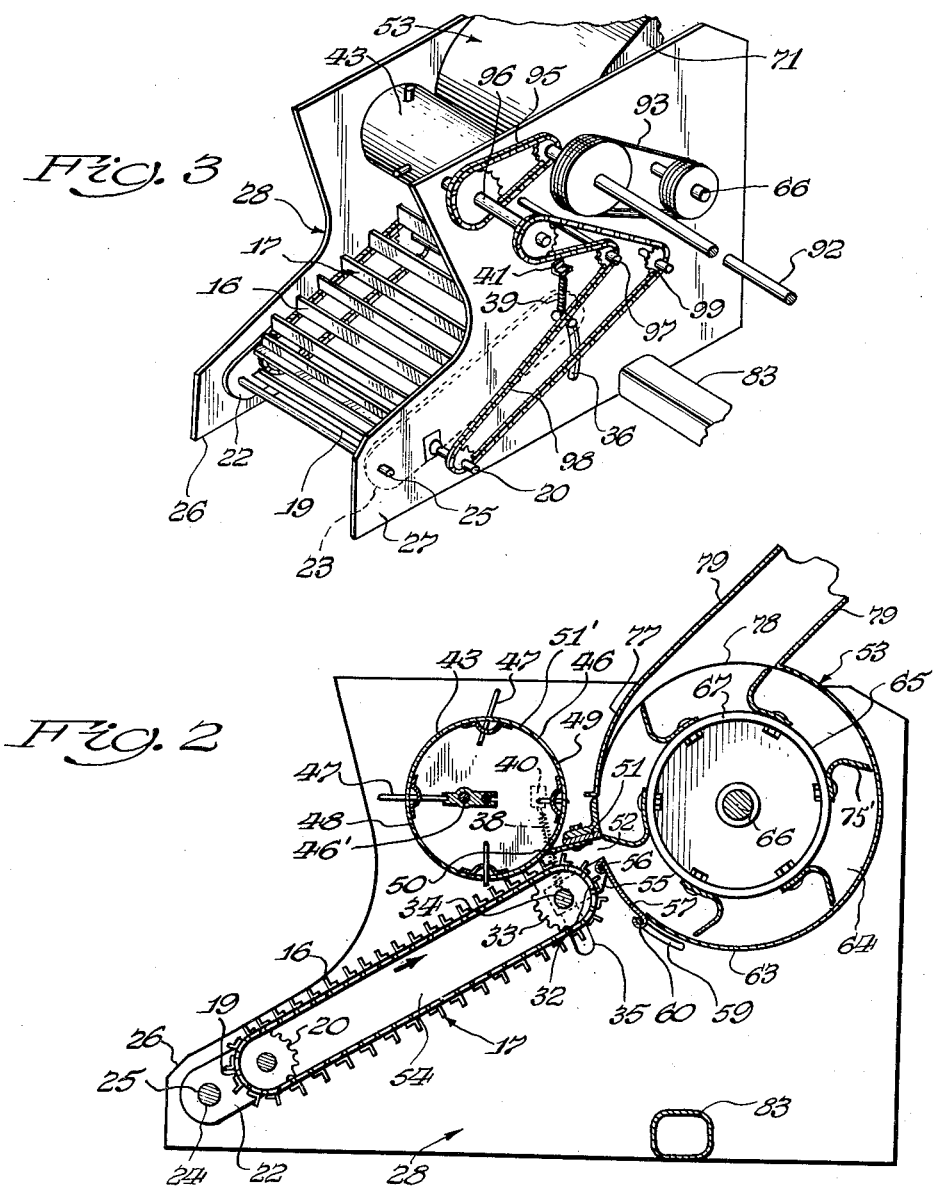
Inventors
Robert H. Witt
Paul O. Pippel
Attorney

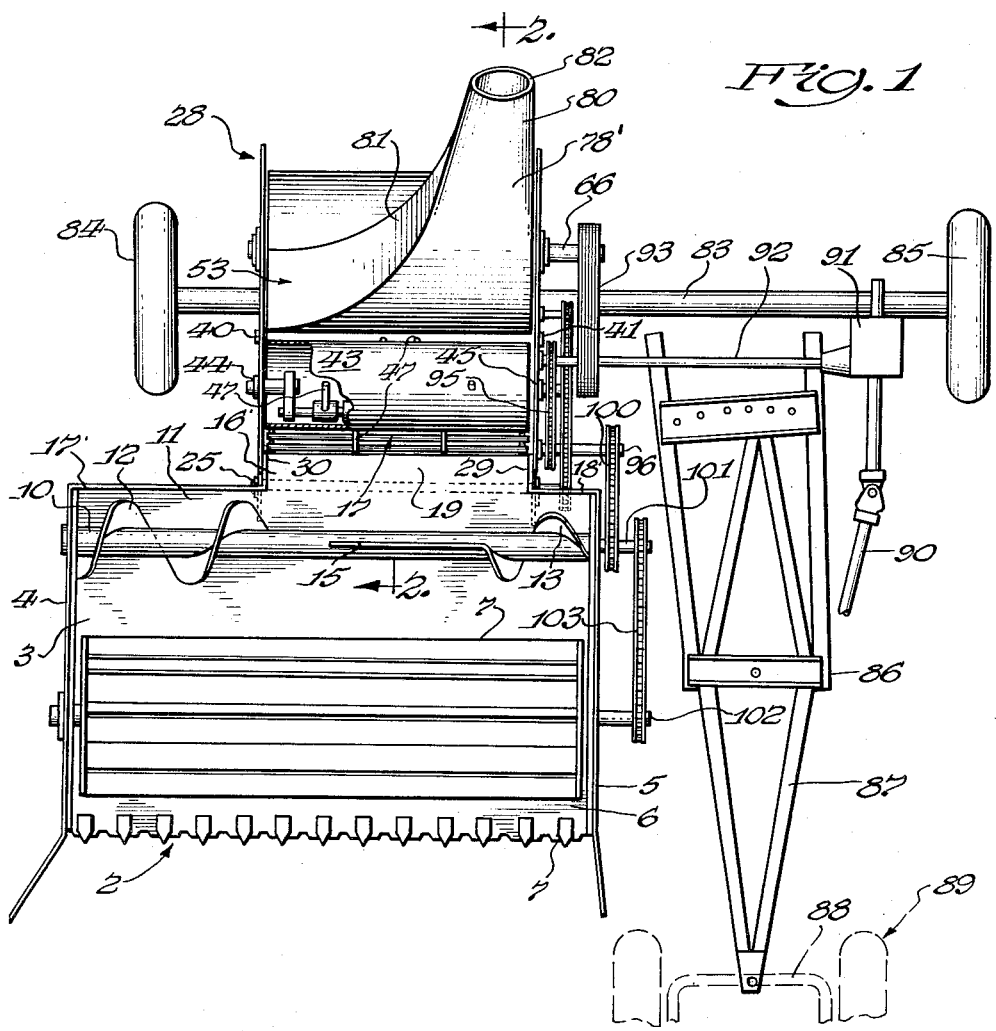

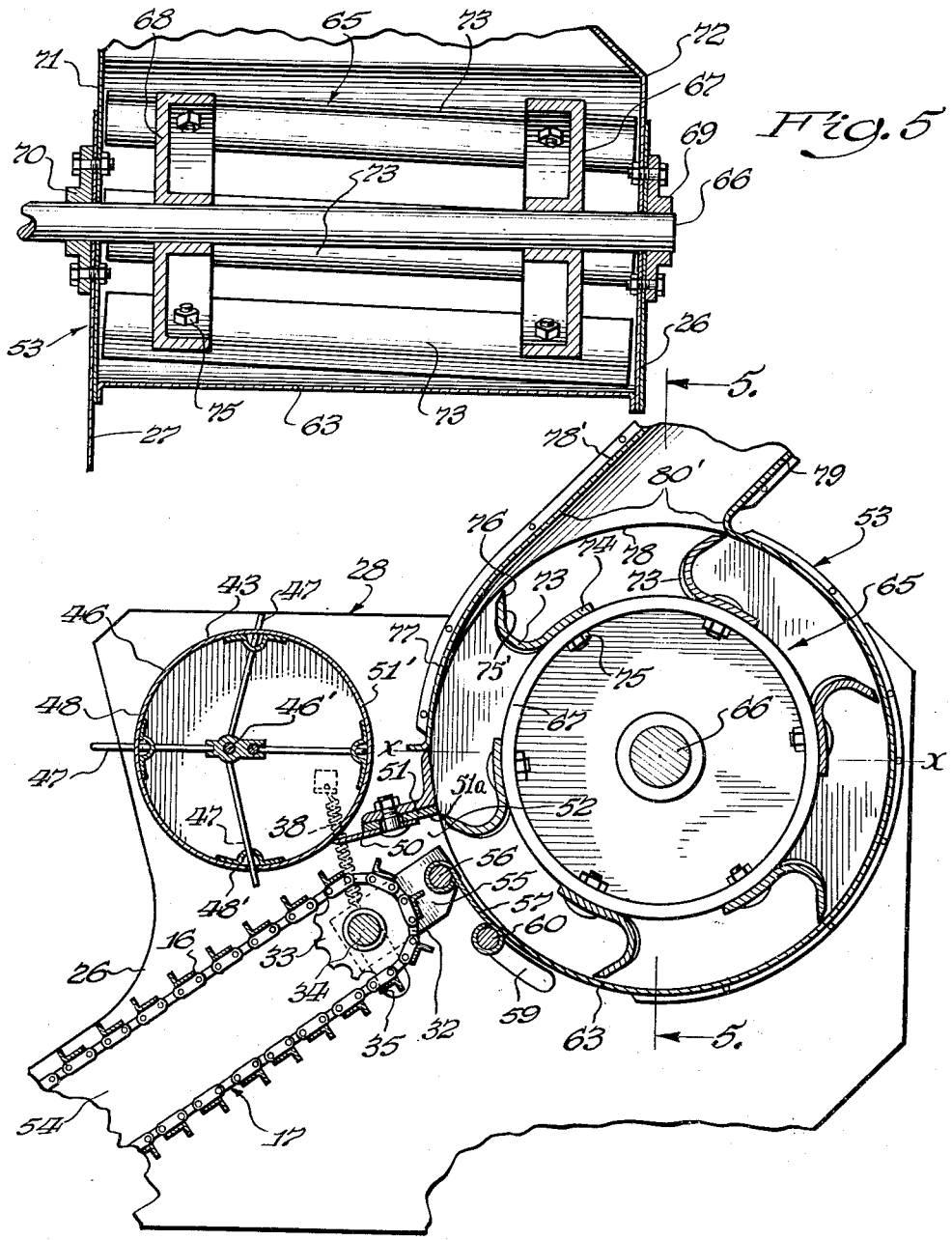

2,998,834
United States Patent Office
Patented Sept. 5, 1961

---

2,998,834
FORAGE HARVESTER WITH UP-CUT CHOPPER AND BLOWER
Ernest C. Carlson, Wheaton, and Robert H. Witt, Hinsdale, Ill., assignors to International Harvester Company, Chicago, Ill., a corporation of New Jersey
Continuation of application Ser. No. 620,478, Nov. 5, 1956. This application Oct. 16, 1958, Ser. No. 768,528
9 Claims. (Cl. 146—119)

This invention relates to harvesters and more specifically to a novel ensilage harvester and is a continuation of U.S. application, now abandoned, Serial No. 620,478, filed on November 5, 1956, in the name of Robert H. Witt for Forage Harvester with Up-Cut Chopper and Blower.

A general object of the invention is to provide a novel forage harvester incorporating novel and improved conveying means including a cutter head which operates to cut upwardly and sling the material through a suitable ducting to a trailing vehicle.

Forage harvesters of current and previous designs feature a forward platform carrying a sickle for cutting an extensive width of material and this is condensed into a narrow throat from which the material is fed into a chopper which cuts downwardly. The material scours the enclosing housing and is flung upwardly and outwardly through a tangential pipe outlet into a wagon.

A more specific object of the invention is to provide a novel forage harvester with a floating lower apron for feeding material into a cutter head which operates to chop upwardly and to throw the material over its back to effect a quick and efficient transition of the material.

A further object is to provide a simplified feeding system comprising two cooperating feeding elements in lieu of the complex plurality of devices used in conventional machines thus obtaining a machine which results not only in lower manufacturing costs but also a simplification in the drives, frame, etc.

More specifically the novel feeding system provides a retractable finger smooth roll structure which has its fingers extended and cooperating with a lower apron thereunder to retrieve material from the attachment units beneath so shown and which retracts its fingers on its rear side so that it may be cleaned by a cooperating scraper.

A still further object is to provide an improved severing and conveying mechanism which comprises a rotor, and in contrast to conventional practice, cuts upwardly and discharges the material into a discharge tube which is positioned along a line approximating the mean line of discharge of the material, the rotor being encased in a housing having a peripheral wall between the inlet, wherein a shear bar is provided, and the outlet and the wall having a scroll section which begins to recede away from the periphery of the rotor from the shear bar to the discharge outlet so as not to impede the flow or movement of the material from the blades of the rotor and to reduce or eliminate frictional scraping of the material along the section as is the situation in conventional choppers wherein the material is cut downwardly.

These and other objects of the invention will become more apparent from the specification and the drawings wherein:

FIGURE 1 is a plan view of the forage harvester incorporating the invention;

FIGURE 2 is a fragmentary sectional view on an enlarged scale taken substantially on the line 2—2 of FIGURE 1;

FIGURE 3 is a fragmentary perspective view of the basic structure;

FIGURE 4 is a fragmentary enlarged view of a portion of the section shown in FIGURE 2; and FIGURE 5 is a radial sectional view taken substantially on the line 5—5 of FIGURE 4.

Describing the invention in detail, the forage harvester generally designated 2 comprises the usual wide platform 3 which includes upstanding side members 4 and 5 and a bottom 6 along the forward edge of which is carried the reciprocating sickle 7 for cutting the material against which the harvester is advanced, the material being carried up the platform by a reel 7' which is supported above the platform bottom 6 by and between the upstanding outboard and inboard walls or panels 4 and 5. The material is fed to an auger 10 which is rotatably carried between the walls 4 and 5 adjacent to the rear portion 11 of the platform and the auger comprises reversely spiraled flights 12 and 13 which condense the material centerwardly of the auger whereat it is moved rearwardly by outstanding axially elongated paddles 15 which move the material to the narrow throat 16' defined by and between the upstanding rear panels 17' and 18' of the platform. The material is discharged by the paddles 15 onto the top run 16 of the conveyor 17 which extends the width of the throat 16'. The conveyor 17 is of the chain and slat type and at its forward end or intake end 19 is rotatably supported on a sprocketed shaft assembly 20 from the support arms 22 and 23 which are pivoted as at 24 by a cross shaft 25 from the side sheets or side walls 26 and 27 (FIGURE 3) of the basic unit generally designated 28, the side sheets 26 and 27 overlapping the rearwardly extending side walls 29 and 30 of the platform throat structure and pivotally connected thereto on a generally horizontal transverse axis by the shaft 25 as best seen in FIGURE 1.

It will be observed that the material is fed diagonally upwardly and rearwardly on the top run 16 and that the discharge or rear delivery extremity 32 of the conveyor 17 is floatingly mounted on a sprocketed shaft assembly 33, the shaft 34 of which extends through arcuate slots 35 and 36 (FIGURES 2 and 3) in the side sheets 26 and 27. The outer extremities of the shaft 34 are suspended by springs 38 and 39 from lugs 40 and 41 carried by the plates 26 and 27 outwardly thereof whereby the apron 17 is continuously urged or biased upwardly.

The upper run 16 of the conveyor 17 passes under a feeding or metering drum 43 which is rotatably supported at opposite ends as at 44 and 45 from the side sheets 26 and 27 and the finger drum 43 having a cylindrical portion 46 and having a crank shaft 46' therein eccentrically mounting a plurality of fingers 47 which are adapted to extend outwardly from the forward side 48 of the drum and sweep the material under the drum 43 while the fingers withdraw at the bottom 48' and back side 49 of the drum as the material is passed under a scraper plate 50 which cooperates with the periphery 51' of the drum to channel or direct the material under the ledger plate or shear member 51 at the upper edge 51a of the mouth or intake opening 52 of the conveying and severing mechanism generally designated 53.

It will be seen that the framework 54 of the apron 17 may form a closed bottom for the top run 16 of the apron and supports a rearwardly extending lug structure 55 to which is pivoted as at 56 the upper end of a gate 57 which at its lower end is confined by a slot 59 and a pin 60 carried by the lower end of the gate 57 to travel substantially concentrically with the lower curved housing portion 63 which forms the cage for the cutter head or rotor drum structure 65. The intake or material receiving opening 52 is thus varied depending upon the volume of material which is being brought into the housing 64. As the apron 17 swings downwardly because of heavy accumulation of material, the opening 52 is widened and opened, and as the material thins out of the opening, of course, will close up.

The head 65 comprises a center shaft 66 on which are keyed a pair of hubs 67 and 68 constrained for rotation therewith. The shaft 66 is journalled adjacent to opposite ends in bearings 69 and 70 in the side walls 71 and 72 of the cage 64. The hubs are connected about their outer peripheries to a series of blades or knives 73, 73 which are trough shaped preferably and which comprise root or inner end portions 74 which are bolted as at 75 to the hubs and the blades which are somewhat trough shaped and have material engaging sides 75′ and extend outwardly and directed into the direction of rotation of the cutter head and have outer sharpened edges 76 which are adapted to cooperate with the ledger plate 51 positioned at the upper edge of the intake opening 52. It will be seen that the eccentrically outwardly disposed upper portion 77 of the cutter head housing immediately begins to recede away from the periphery 78 of the cutter head and continues in a preferably gradual curve upwardly and rearwardly to form a top wall 78′ of the discharge spout 80 which is disposed approximately tangential to the cutter head. It will be seen that the extent of the material discharging opening proper 80′ is from 60° to 120° from the intake opening and that the entire discharge opening extends from approximately 0° to 120°. The intake opening 52 is located below the center plane or horizontal plane X—X (FIGURE 4) of the cutter head. The back wall 79 of the tube generally parallels the wall 78′ and forms a cut off. The back wall section 63 of the housing or casing is concentric with the shaft 66 and in close proximity to the periphery 78.

Referring now to FIGURE 1, it will be seen that the discharge opening is converged by an upwardly and laterally converging side plate or panel 81 into a relatively narrow preferably although not necessarily circular discharge duct 82.

The basic structure 28 is supported by its side members 26 and 27 from the axle 83 which in turn is mounted on wheels 84 and 85. The axle structure is connected to a draft frame 86 which is connected through a dial hitch 87 to an associated motive device such as a drawbar 88 to an associated tractor 89.

It will be seen that the entire harvester is herein shown merely by way of example as driven from the power take-off shaft 90 which through a gear box 91 drives the main drive shaft 92 which in turn through belt and pulley drive 93 rotates and drives the shaft 66 of the cutter head. The shaft 92 also drives through a chain and sprocket assembly 95, a counter shaft 96 which in turn drives the metering drum shaft 97 (FIGURE 3) and the drum shaft assembly 20 of the apron through a chain and sprocket device 98 which may be suitably tightened by an idler assembly 99. The shaft 96 may also be provided with a chain and sprocket assembly 100 and drive the auger 10 and the auger 10 may have its shaft 101 driving the shaft 102 of the reel 7 by a chain and sprocket drive 103 as best seen in FIGURE 1.

What is claimed is:

1. In a harvester, a support, an apron conveyor having intake and discharge ends and pivoted on the support at the intake end for vertical swinging movement at said discharge end, a chopper having a housing with circumferentially spaced inlet and outlet and said inlet disposed in receiving relation to said discharge end of the apron and said outlet disposed above the inlet, said housing having an arcuate wall below said inlet, means pivotally and movably mounting said conveyor on said wall to vary the area of the inlet, said inlet defined by an upper edge above the apron, a cutting element on said upper edge, and a cutter head rotatably mounted in said housing and having peripheral blades cooperating with said element, and means for rotating said head in a direction moving upwardly opposite the inlet, said outlet disposed above and behind said inlet.

2. A forage conveying and severing apparatus including a throat structure, a conveyor mounted on the bottom of the structure and having an upper delivery run and having receiving and discharge ends, means pivotally mounting said conveyor at said receiving end for accommodating upward swinging movement of the conveyor at said discharge end, a severing and conveying apparatus having a casing with a material receiving opening disposed in receiving relation to the discharge end of the conveyor, and a gate connected to said discharge end of the conveyor and movable therewith in accordance with the volume and weight of material on the conveyor disposed beneath the same and cooperatively associated with the housing across said receiving opening for controlling the extent thereof in accordance with the position of the conveyor.

3. A forage severing and conveying apparatus comprising a generally cylindrical housing, a rotor coaxially mounted therein on a generally horizontal axis, said housing having a generally horizontal inlet opening and a vertical discharge opening, said rotor having a plurality of peripheral axially extending fixedly mounted blades thereon, said housing having a circumferential wall encompassing the rotor and extending beneath the same and presenting upper and lower edges defining the top and bottom of the inlet opening and presenting forward and rear edges defining opposite edges of said discharge opening, a shear bar mounted on said housing along said upper edge of the inlet opening, said circumferential wall having a segment extending between the upper edge of said inlet opening and the forward edge of the outlet opening and said segment diverging upwardly toward the outlet opening with respect to the peripheral path of said blades of the rotor, said rotor rotating in a direction so that its side adjacent to the inlet opening moves upwardly, and said circumferential wall having another segment extending from the said rear edge and terminating short of the lower edge and closely approximating the peripheral path of the blades and a further segment mounted in extension of said other segment and movable toward and away from said upper edge to vary the size of the inlet opening.

4. The invention according to claim 3 and conveying means mounted on said further segment in delivering relation to the inlet opening, and means spring loading said further segment in a closing direction thereof to said inlet opening.

5. A forage chopper comprising a generally cylindrical housing, a rotary cutter therein mounted on a generally horizontal axis, said housing having a longitudinal opening on one side of said housing, a shear bar on the upper edge of said opening in coacting relation with said cutter, said housing having a discharge opening in the top thereof, the wall of said housing from the shear bar to the adjacent edge of said discharge opening being eccentric outwardly.

6. The invention according to claim 5 and said housing having a segment extending between said opening in said one side beneath and behind the cutter to said discharge opening substantially concentric with the cutter in close proximity to the periphery of the cutter.

7. The invention according to claim 5 and said cutter having fixedly mounted trough shaped blades.

8. The invention according to claim 5 and conveying means having a discharge end supported in delivering relation to said opening in said side of the housing and projecting forwardly therefrom.

9. The invention according to claim 5 and conveying means extending forwardly from the housing beneath said opening in one side thereof and floatingly mounted adjacent to said side opening.

References Cited in the file of this patent

UNITED STATES PATENTS

| | | |
|---|---|---|
| 932,745 | Adelsperger | Aug. 31, 1909 |
| 1,940,531 | Bullock | Dec. 19, 1933 |
| 2,119,336 | Holland-Letz | May 31, 1938 |
| 2,476,177 | Bloom et al. | July 12, 1949 |
| 2,561,069 | Peterson | July 17, 1951 |
| 2,606,559 | Maus | Aug. 12, 1952 |
| 2,669,271 | Treckmann | Feb. 16, 1954 |
| 2,690,777 | Korber et al. | Oct. 5, 1954 |
| 2,763,115 | Skromme | Sept. 18, 1956 |
| 2,786,317 | Lundell | Mar. 26, 1957 |